United States Patent
Shomali

(10) Patent No.: US 7,006,002 B2
(45) Date of Patent: Feb. 28, 2006

(54) COMBINATION POWER FAILURE LIGHT AND FM/AM RADIO WITH A CLOCK AND ALARM FUNCTION

(75) Inventor: Hamid Shomali, Lafayette, CA (US)

(73) Assignee: Eton Corporation, Palo Alto, CA (US)

(*) Notice: Subject to any disclaimer, the term of this patent is extended or adjusted under 35 U.S.C. 154(b) by 173 days.

(21) Appl. No.: 10/795,916

(22) Filed: Mar. 8, 2004

(65) Prior Publication Data

US 2005/0195089 A1 Sep. 8, 2005

(51) Int. Cl.
*G08B 23/00* (2006.01)

(52) U.S. Cl. .................. 340/693.1; 340/652; 340/664; 340/635; 340/636.12; 340/691.8; 340/539.1

(58) Field of Classification Search ............ 340/693.1, 340/691.8, 652, 664, 635, 636.12, 636.18, 340/539.1, 825.69, 825.72; 362/10, 86, 183, 362/253
See application file for complete search history.

(56) References Cited

U.S. PATENT DOCUMENTS

| | | |
|---|---|---|
| 3,368,067 A | 2/1968 | Paxinos |
| 3,968,417 A | 7/1976 | Dials |
| 4,045,663 A | 8/1977 | Young |
| 4,434,509 A * | 2/1984 | Schrepel .................. 455/343.1 |
| 4,631,649 A | 12/1986 | McCue et al. |
| 4,682,147 A | 7/1987 | Bowman |
| 4,686,424 A | 8/1987 | Nuckolls et al. |
| 4,799,039 A | 1/1989 | Balcom et al. |
| 4,949,077 A | 8/1990 | Mbuthia |
| 5,014,168 A | 5/1991 | Kelly |
| 5,055,986 A | 10/1991 | Johnson |
| 5,465,198 A | 11/1995 | Kellogg |
| 6,045,235 A | 4/2000 | Hee |
| 6,238,061 B1 | 5/2001 | McKenzie et al. |
| 6,474,828 B1 | 11/2002 | Chin |
| 6,536,917 B1 | 3/2003 | Aperocho et al. |
| 6,617,964 B1 | 9/2003 | Lamb |
| 6,634,768 B1 | 10/2003 | McKenzie et al. |
| 6,795,377 B1 * | 9/2004 | Gorden ....................... 368/12 |
| 2005/0094036 A1 * | 5/2005 | Tichelaar |

* cited by examiner

*Primary Examiner*—Hung Nguyen
(74) *Attorney, Agent, or Firm*—Jones Day; Brett Lovejoy

(57) ABSTRACT

A device comprising a housing, a battery source, a transformer, a light, a radio, and a clock. The battery source is held in the housing and provides a first source of direct current (DC). The transformer, which is also held in the housing, is configured for receiving an alternating current (AC) from a source of AC and for converting the AC to a second source of DC. The light, the radio and the clock are also held in the housing. The light, the radio and the clock are operatively connected to the battery source and the transformer to receive the first and/or second source of DC thereby energizing these components. The device further includes a sensor, in electrical communication with the radio, for detecting AC availability. The radio has several modes. In a first mode, the radio is off regardless of whether the sensor detects availability of the AC. In a second mode, the radio is on when the sensor detects AC availability and the radio is off when the sensor determines that the AC is not available. In a third mode, the radio is on regardless of the availability of the AC.

23 Claims, 4 Drawing Sheets

COMBINATION POWER FAILURE LIGHT AND FM/AM RADIO WITH A CLOCK AND ALARM FUNCTION

FIELD OF THE INVENTION

This invention relates to emergency lighting and public communication equipment in general, and to combination emergency lighting and public communication equipment in particular.

BACKGROUND OF THE INVENTION

One of the problems that exists during power outages is that of corresponding disruption of communication, lack of visibility in darkened structures or areas and disorientation as to the time of day or night. These circumstances may occur to a lesser extent during relatively minor power disruptions such as thunderstorms, transformer or other service equipment malfunctions and the like, or in more serious power outages during hurricanes, tornadoes, war and similar circumstances.

In the past, there have been efforts to provide lighting and communication equipment that may be useful during such emergencies. For example, U.S. Pat. No. 3,368,067, entitled "Clock Radio Lamp Combination," to Paxinos provides a clock-radio combination having a high-intensity lamp, a clock and a radio. However, this combination can only be powered by a source of household alternating current, which in the case of a power failure or black-out, would not be useful for either lighting or listening to the radio.

U.S. Pat. No. 4,631,649, entitled "Plug-In Emergency Light Fixture," to McCue et al. provides an emergency light fixture permanently mounted in a conventional power outlet box having a threaded bore for accommodating a screw to mount a face plate, and slots for accommodating an electric plug. The emergency light fixture includes a housing, an electric plug extending from the rear wall of the housing, a battery, a battery charger and a lamp mounted in the housing and wired to provide illumination during power outages. A drawback with the McCue et al. device is that it is permanently mounted in a wall outlet. As such, the device is not useful in a number of emergency situations, such as when the occupants of a dwelling seek to evacuate the dwelling for a better shelter such as a storm cellar.

U.S. Pat. No. 4,682,147, entitled "Emergency Sign," to Bowman details an illuminated exit sign having multiple, series-connected, light-emitting diodes arranged to form the word "EXIT" and a control circuit for supplying power to the series-connected diodes from the line power and, during power failures, from battery power. The control circuit illuminates the diodes continuously during normal operation and switches the diodes alternately on and off during a power failure. While the Bowman device has considerable utility in its own right, it, like the McCue et al. device, cannot be used to perform a number of emergency functions such as providing portable light.

U.S. Pat. No. 4,686,424, entitled "Emergency Lighting Circuits," to Nuckolls et al. details an emergency lighting circuit that includes a lamp which can be energized by a battery-inverter circuit upon power failure. The battery is connected to the inverter circuit and the lamp by a relay that is connected to the rectifier supplying charging current to the battery. The rectifier is connected across the power supply line in series with a ballast reactor. The circuit can be used as emergency lighting only, or the lamp can be employed for normal lighting purposes and switched to the inverter power when line voltage is interrupted. U.S. Pat. No. 4,799,039, entitled "Emergency Lighting Supervisory System," to Balcom et al. details a system that monitors utility power, in order to automatically connect emergency lights to a battery source when the utility power fails. The system continually monitors selected parameters, automatically periodically tests the system under simulated, full-load conditions and enunciates the results of these tests. The drawback with the Nuckolls et al. and Balcom et al. devices, is that, like the Bowman and McCue et al. devices, they are permanently fixed to conventional power lines and therefore cannot be used in a number of emergency scenarios.

U.S. Pat. No. 5,055,986, entitled "Combination Light, Radio and Clock," to Johnson provides a device having a small incandescent light, a radio and clock, all housed within the same cabinet or housing. The light, clock and radio can be used during emergencies when energized by replaceable, rechargeable or non-rechargeable batteries. The Johnson device, while functional, is unsatisfactory. The device includes a power cord. Thus, although the radio will work on battery power, the presence of the power cord makes use of the radio as a portable emergency radio awkward. Furthermore, the light is on the front of the device. Given the flat design of the Johnson device, the positioning of the light on the front panel of the device makes operation of the Johnson device as a flashlight awkward.

U.S. Patent No. 5,465,198, entitled "Combination Clock Radio, Night Light and Power Receptacle," to Kellogg describes a combination appliance that includes the features of a radio, a clock and a light fixture and an electrical receptacle operated by alternating current. However, the Kellogg appliance is entirely reliant on household current and as such, is wholly inadequate for emergency situations where device portability is needed. Furthermore, the light in the Kellogg appliance is a night light, which again is unsatisfactory for emergency situations, where a bright light is needed.

U.S. Pat. No. 6,238,061 B1, entitled "Combination Lighting System, Alarm Clock, Radio and Television Having Secondary Power Supply," to McKenzie et al. describes a self-contained, portable, remote controlled combination television receiver, FM/AM radio receiver, clock and electric lamp. Alternative embodiments provide the lamp alone, the lamp and the radio receiver alone, or the lamp and the television receiver alone. Regardless, the McKenzie et al. device as described is bulky and has a power cord, making its use as an emergency device awkward in many emergency situations. For instance, the McKenzie device comes with a remote controlled device in order to control the lamp, radio, and television receiver suggesting the immobility of the device. And one suggested power source is a car battery.

U.S. Pat. No. 6,536,917 B1, entitled "Combination Flashlight and Two-way Radio," to Aperocho et al. describes a combination flashlight and two-way radio. The Aperocho et al. device includes a recharging control base that plugs into a conventional AC current source. As such, the Aperocho et al. has the drawback of being complex. Moreover, the Aperocho et al. device lacks important functionality such as a clock and an FM/AM radio.

Given the above background, what is needed beyond the prior art are improved light weight portable emergency devices that are useful in a broad array of emergency situations.

SUMMARY OF THE INVENTION

The present invention addresses the drawbacks found in prior art devices. The present invention provides a device in an integrated housing that includes a light, FM/AM radio, and clock that are each regulated by an auto power on feature in the event of power failure. The FM/AM radio has three modes, "power off" mode, "standby" mode, and "radio on" mode. In the "power off" mode, the radio is turned off regardless of the current source. In "standby" mode, the radio turns on when there is an AC current source loss. An AC current source loss occurs either when the device is unplugged or during a power outage. In "radio on" mode, the FM/AM radio is on regardless of the AC current source status. The light has two mode "alert" and "off". In "alert" mode, the light is illuminated when there is an AC current source loss. In "off" mode, the light does not illuminate, regardless of the current source status.

Some embodiments of the device include a collapsible plug that can be used to plug the device directly into an outlet, allowing a rechargeable battery pack in the device to recharge. In preferred embodiments, the clock includes a display with a backlight feature that illuminates when the device is plugged into the wall. The backlight feature turns off when the AC current source is lost, either because the device has been unplugged from the outlet or due to a power outage. The device preferably includes an antenna and a headphone jack. The device will use the headphone cord as an antenna in instances where the headphone cord is inserted in the headphone jack and the telescopic antenna is retracted.

The present invention is highly advantageous. The device can be set so that, during a blackout the light and/or radio/alarm automatically turn on. This serves as an important orientation functionality to those in the vicinity of the device. The light and sound guides such persons to the device even in the event of a total blackout. Then, the device can be unplugged from the wall and used as a flashlight and portable radio.

Some embodiments of the device include an alarm clock. This feature, combined with its light weight allows for the use of that device as a traveling aid, thereby reducing reliance on hotel alarm clocks, wake up calls, and emergency lighting. In some embodiments the device is water resistant so that it can be used in a bathroom or kitchen. In some embodiments, the device further includes a smoke detector.

BRIEF DESCRIPTION OF THE DRAWINGS

Like reference numerals refer to corresponding parts throughout the several views of the drawings.

DETAILED DESCRIPTION

Figure 1:
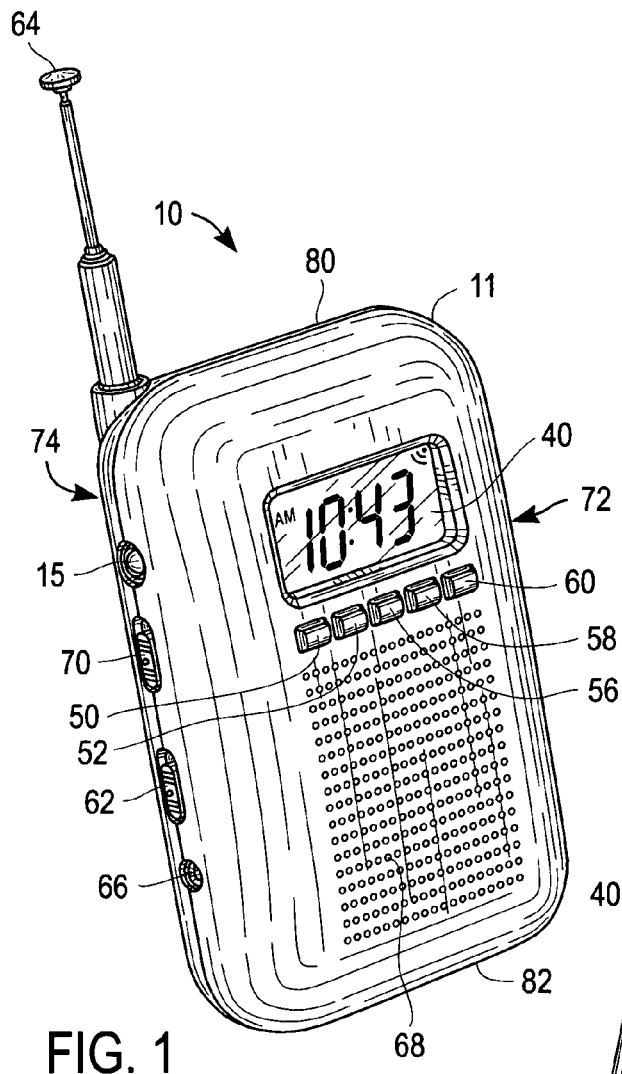
FIG. 1 illustrates a first front perspective view of a preferred embodiment of the combination light, radio, and clock of this invention.

FIG. 1 shows a preferred embodiment of the present invention, hereafter referred to in the alternative as the apparatus 10. The apparatus 10 comprises a combined lamp, alarm clock, and radio receiver all integrally contained within a housing 11. In a preferred embodiment, housing 11 is generally rectangular as illustrated in FIG. 1. In a preferred embodiment housing 11 has a metallic silver or metallic pearl finish. In other embodiments housing 11 has a colored finish, such as blue, white, or pink. However, the invention is not limited to such finishes and any suitable casing finish is within the scope of the present invention. The embodiment illustrated in FIG. 1, which is not drawn to scale, is approximately three inches wide (as measured from side 74 to side 72), has a height of approximately five inches (as measured from bottom 82 to top 80), and has a depth of approximately 1.4 inches. While the invention is not limited to such dimensions, in preferred embodiments, apparatus 10 is dimensioned and configured so that it can be plugged into a wall outlet. In some embodiments of the present invention, apparatus 10 weighs between 5 ounces and 16 ounces. The embodiment illustrated in FIG. 1 weighs 10 ounces.

The lamp section comprises a source of illumination 15. In some embodiments, there is a shade (not shown) that covers illumination source 15 so as to provide a desired night-light type lighting effect. In some embodiments, illumination source 15 includes a dimmer control (not shown). In a preferred embodiment, illumination source 15 provides illumination in flashlight type arc. As such, apparatus 10 can be used as a flashlight. In some embodiments of the present invention, illumination source 15 is an LED light that, when illuminated, has a normal current drain of 20 mA and a maximum current drain of 26 mA.

Figure 2:
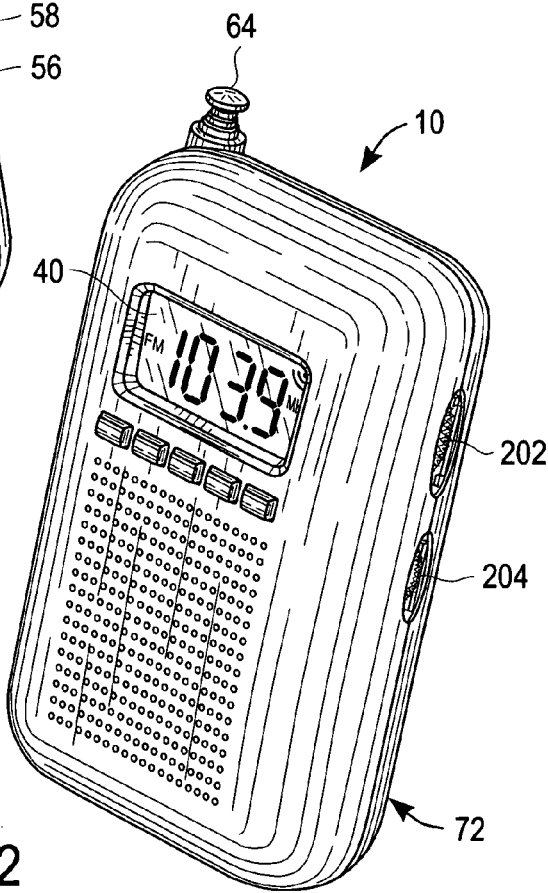
FIG. 2 illustrates a second front perspective view of the combination light, radio, and clock of this invention.

The radio receiver comprises radio signal receiving and processing circuitry, a tuning dial 202, an on/off volume control 204, a display 40 (FIG. 2) for displaying an indication of whether the radio is tuned using the AM or FM band and the frequency to which the radio is tuned, an FM/AM band toggle switch 62 to control whether the radio is tuned to the AM band or the FM band, and an antenna. In typical embodiments the antenna includes a built in ferrite bar antenna (not shown) for AM and a telescoping 64 antenna for FM.

A significant advantage of button 70 is that it allows the radio to be set into one of three modes. When the radio is set in a first mode ("off mode"), the radio is off regardless of whether alternating current is available to the radio. When the radio is set in a second mode ("alert mode"), the radio is off when the alternating current is available to the radio and the radio is on when the alternating current is not available to the transformer means. When the radio is set in a third mode ("on"), the radio is on regardless of whether the alternating current is available. Thus, a user can use apparatus 10 in a variety of emergency and non-emergency situations. To conserve battery power, the first mode of the radio can be used to keep the radio completely turned off regardless of whether the radio has access to AC power. The second mode of the radio can be used in those situations where one desires the radio to "turn on" when there is a power outage. This second mode of the radio is useful for localizing apparatus 10 during a power outage where visibility is likely to be reduced. In such instances, the radio acts as a beacon, helping people in the vicinity of the radio to find apparatus 10. In addition to helping localize apparatus 10 in an emergency setting, the second mode of the radio is advantageous because it can be used as an alarm to indicate that power has been lost. Thus, the second mode of the radio of apparatus 10 can be used in power critical situations, such as emergency rooms, construction sites, nursing homes, and the like. In the third mode, the radio is on regardless of whether the alternating current is available. Thus, the third radio mode complements the other two radio modes, enabling apparatus 10 to be used as a conventional radio.

In some embodiments of the present invention, illumination source 15 is a white light emitting diode (LED). In preferred embodiments of the present invention, illumination source 15 has two modes and switch 70 is used to toggle between these two modes. In the first mode, illumination source 15 is off regardless of whether alternating current is available. When the illumination source 15 is set in the second mode, the light is off when alternating current is available and the light is on when the alternating current is not available. The provision of these two modes provides novel advantages to apparatus 10. When in the first mode, illumination source 15 is off regardless of the AC power supply status, thereby conserving battery life for other functions such as the radio and/or clock. When in the second mode, illumination source 15 can serve as an emergency light. Further, when in the second mode, illumination source 15 can serve as a beacon to assist in localizing the device.

Apparatus 10 further includes output jack 66 for an ear piece. In some embodiments, output jack 66 supports stereo headsets. Advantageously, when a headset is plugged into jack 66, the radio can use the headphone cord (not shown) as an antenna. In one embodiment of the present invention, when a headphone cord is inserted in headphone jack 66, the headphone cord is used by the radio as an antenna in instances where the retractable telescopic antenna 64 is in the retracted position of FIG. 2.

The clock, having a settable alarm capability, is set using hour button 50 and minute button 52 in conjunction with time set button 60. Time can be displayed on display 40 as illustrated in FIG. 1, along with an AM/PM indicator. The alarm is set on and off using button 56 and alarm time is set using hour button 50 and minute button 52 in conjunction with alarm set button 58. Apparatus 10 further provides a loudspeaker 68 to reproduce audible sound from the radio and/or alarm.

Under normal conditions, apparatus 10 is energized by a source of alternating current (AC) power, such as ordinary household current. Advantageously, the AC power is supplied to the present invention 10 using a collapsible plug 402 (FIG. 4), when the plug 40 is connected to an AC source in the usual manner. Typically, the AC current source is in the form of an electrical receptacle that provides a 105–125 volt, 55–65 Hz power source when connected to the source of alternating current. The collapsible plug is highly advantageous because it allows apparatus 10 to be easily mounted in any outlet, such as in the bathroom, kitchen, garage, or other convenient locations. Then, when apparatus 10 is needed for portable purposes, such as in the case of an emergency, the apparatus can simply be unplugged and the collapsible plug can be folded to the down position 502 that is illustrated in FIG. 5.

Figure 4:
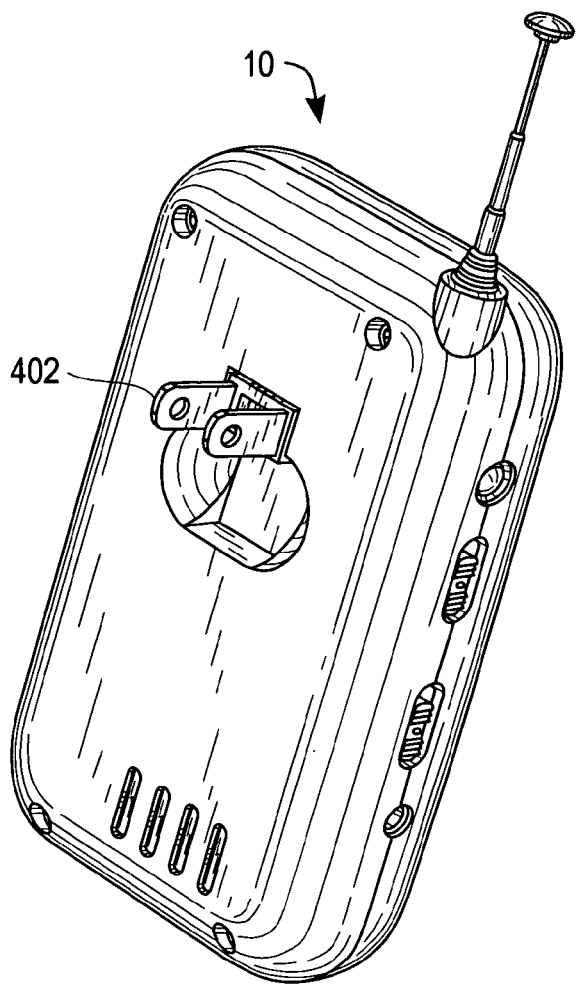
FIG. 4 illustrates a first rear perspective view of the combination light, radio and clock illustrated in FIG. 1 in which a collapsible plug used to power the device is in an extended position.
Figure 5:
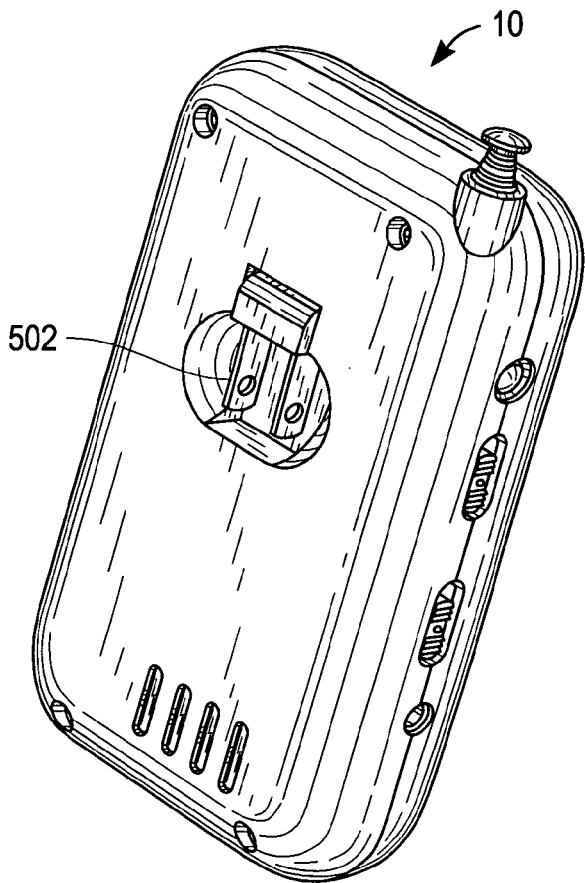
FIG. 5 illustrates a second first rear perspective view of the combination light, radio and clock illustrated in FIG. 1 in which the collapsible plug is in a collapsed position.

The collapsible plug illustrated in FIGS. 4 and 5 provide apparatus 10 with a distinct advantage over many known emergency devices. The collapsible plug, in combination with the light and radio feature, allow apparatus 10 to be used as a portable radio and/or flashlight without any need for a charging base or other form of adapter stand. In fact, in one preferred embodiment, light 15 is positioned on the side 74 (as shown in FIG. 1) or the side 72 of apparatus 10, as opposed to the front panel of apparatus 10 where control buttons 50 through 60 are situated. In another preferred embodiment, light 15 is position on top 80 or bottom 82. Such embodiments facilitate the use of apparatus 10 as a flashlight from an ergonomical standpoint and further allows for the control of the radio and alarm setting features while illumination source 15 is on.

Figure 3:
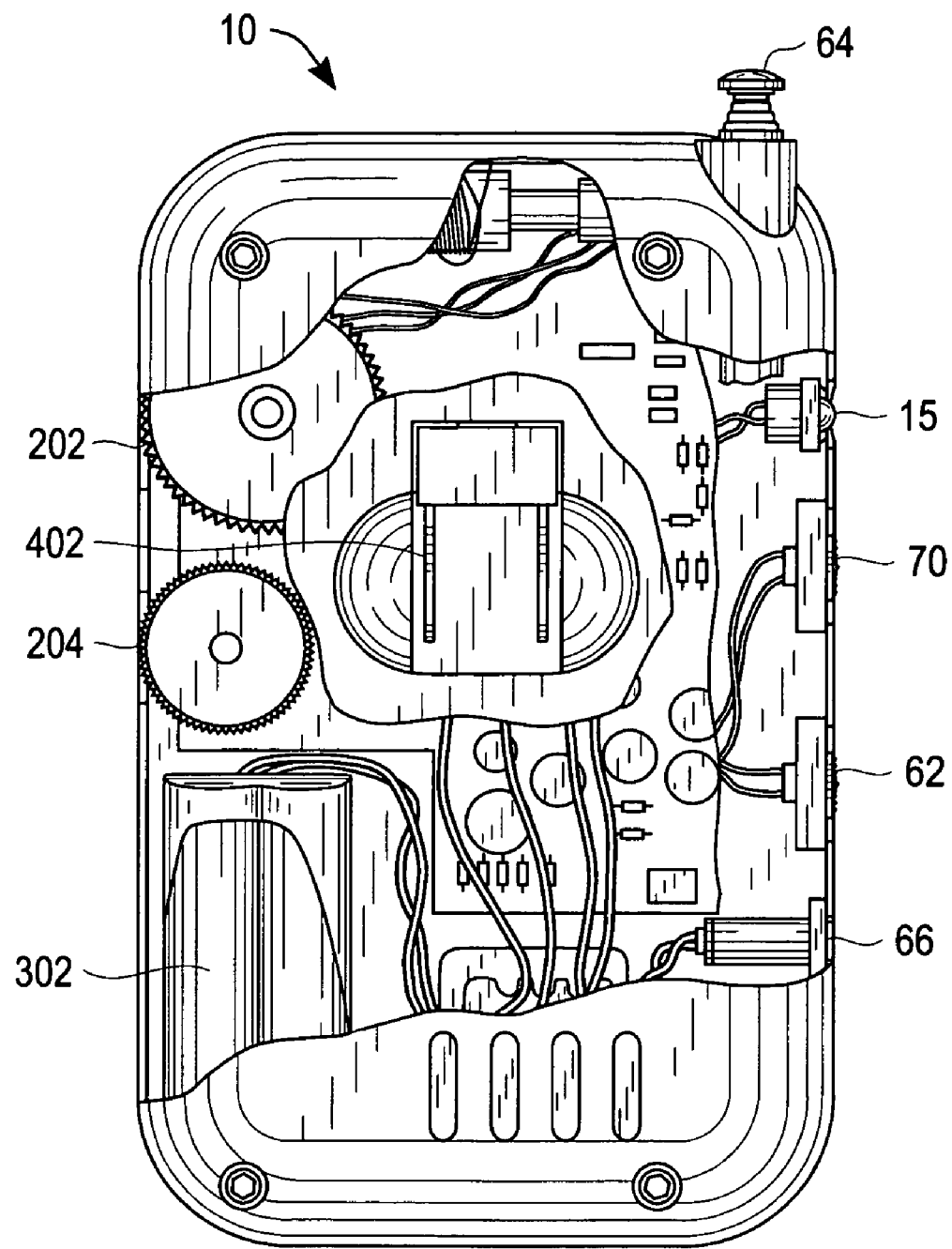
FIG. 3 illustrates a rear view, partially in section, of the combination light, radio and clock illustrated in FIG. 1.

Upon the occurrence of an emergency situation, such as a power failure or black-out, apparatus 10 can be energized by a direct current (DC) source, such as by battery pack 302 (FIG. 3). A battery compartment serves to house battery pack 302. Battery pack 302 can comprise one or more batteries. The batteries in battery pack 302 can be either disposable or rechargeable. In the case where batteries 302 are rechargeable, recharging power is obtained from converted alternating current via battery charging circuitry when apparatus 10 is connected to a source of AC power by plug 402. In other words, battery pack 302 is constantly being recharged when apparatus 10 is provided with AC power, so that in the event of an emergency situation, illumination source 15, the radio, and the clock will readily be available to the user.

In some embodiments, battery pack comprises a rechargeable battery and a non-rechargeable battery and further comprises a relay mechanism (not shown) connected to the rechargeable battery and the non-rechargeable battery, whereby the non-rechargeable battery supplies direct current to other components of apparatus 10 (e.g., light 15, the radio and the clock) responsive to low voltage in the rechargeable battery and operation of the relay mechanism.

In some embodiments of the present invention, battery pack 302 (battery source) includes a rechargeable battery and a transformer connected to battery pack 302 so that, when a transformer (not shown) receives alternating current from a source of alternating current (e.g., a standard source of AC power) and converts it to a source of direct current, the direct current recharges the rechargeable battery. In some embodiments of the present invention, the transformer provides a DC supply voltage of 4.8 volts, with 50 mW of power and a load resistance of 8 ohms using a standard 120V, 60 Hz source of power.

In some embodiments of the present invention, display 40 has a backlight feature. In some embodiments, the backlight is not illuminated when a source of alternating current is available to apparatus 10. Because of the power consuming properties of the backlight, in preferred embodiments, the backlight is typically only illuminated when the source of alternating current is available to apparatus 10. As such, the backlight is typically not illuminated when the source of alternating current is not available to apparatus 10. The backlight feature operates independently of the display functionality used to display clock time and/or radio frequency signal. In other words, clock time and/or radio frequency signal is displayed on display 40 even when the backlight feature is turned off. The backlight feature is advantageous because if facilitates viewing the time and/or radio frequency signal in a darkened room. In some embodiments of the present invention, the backlight feature provides a white, bluish, greenish, pink, or magenta glow.

Another embodiment of the present invention comprises illumination source 15, with the above described two modes without the clock or the radio. As shown and discussed above, electrical power is provided by either a source of alternating current (AC) or by a source of direct current (DC), including the battery recharging features. Yet another embodiment of the present invention comprises the radio receiver with the above described three clock modes, without illumination source 15.

In the embodiment illustrated in FIGS. 1–5, apparatus 10 is dimensioned and configured such that it obstructs both receptacles in a standard two-receptacle power outlet. Even when apparatus 10 is plugged into the lower receptacle, the upper receptacle is blocked. Therefore, in some embodiments of the present invention, apparatus 10 includes a bypass electrical receptacle (not shown) so that a receptacle remains available. This embodiment is useful in situations, such as the bathroom, where the apparatus can be plugged into the power outlet but still provide a receptacle for use by a blow dryer, electric razor, or curling iron, etc.

Figure 6:
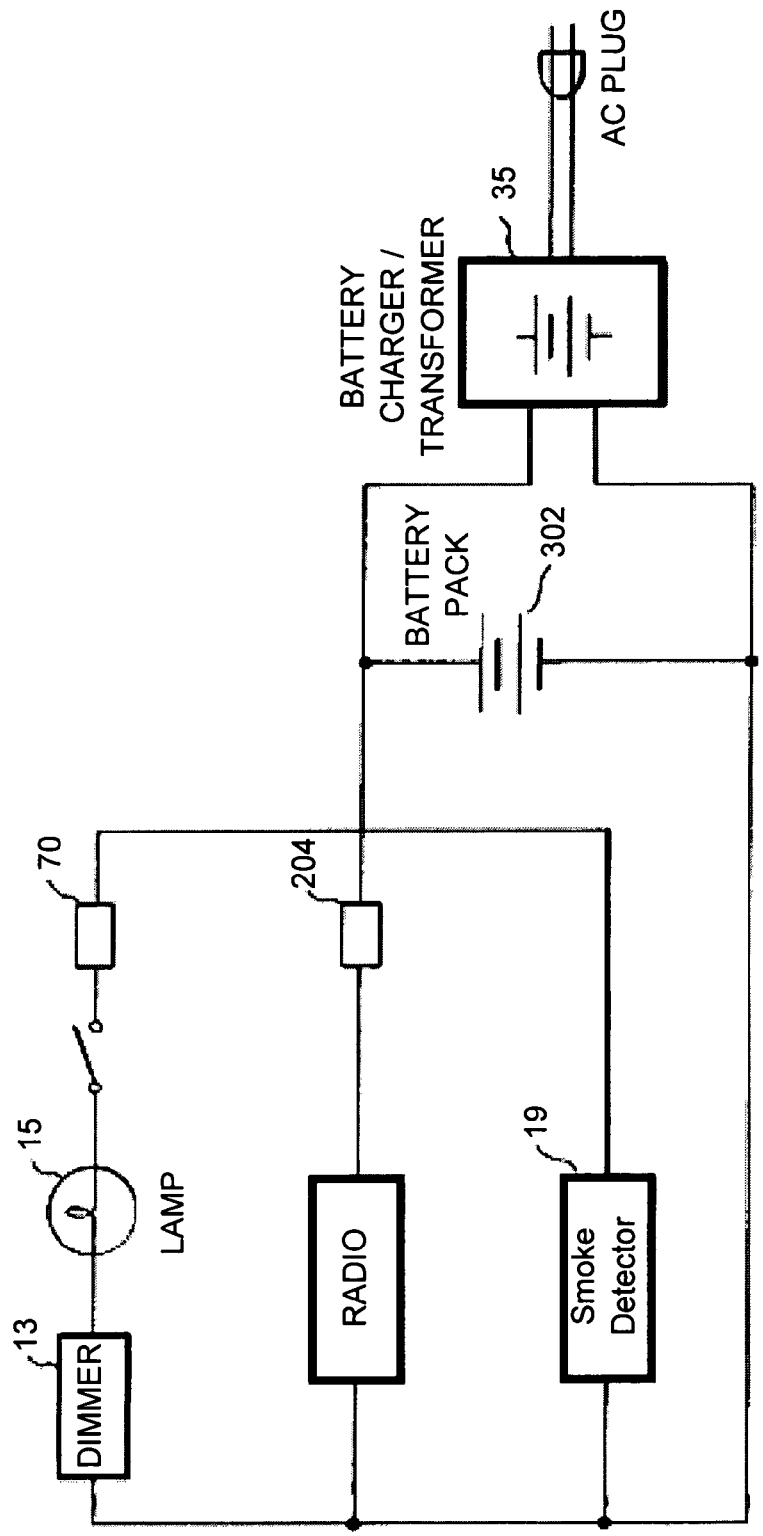
FIG. 6 illustrates a schematic wiring diagram of the combination light, radio, and clock illustrated in FIG. 1 with a smoke alarm.

FIG. 6 shows a schematic wiring diagram for apparatus 10. The source of illumination 15 is in electrical connection with and energized by a source of power, either AC power supplied through collapsible plug 402 (through battery charger/transformer 35), or DC power supplied from battery pack 302. The source of illumination 15 is optionally controlled by dimmer 13. The case as to which source 402 or 302 is actually supplying power to the illumination source 15 depends on whether or not an emergency situation exists requiring use of the battery pack 302. Similarly, the radio and optional smoke detector 19 are also in electrical connection with the AC source and the DC source.

In some embodiments of the present invention, apparatus 11 is water resistant so that the apparatus can be used in a kitchen or bathroom. Further, in some embodiments of the present invention, apparatus 10 includes a smoke detector. In such embodiments, the smoke detector complements the other emergency features of apparatus 10 described above.

In one embodiment of the present invention, the AM radio of apparatus 10 has the specifications provided in Table 1.

TABLE 1

AM RADIO SPECIFICATION

| MEASUREMENT ITEM | | UNIT | NORMAL | LIMIT | TEST CONDITION |
|---|---|---|---|---|---|
| FREQUENCY RANGE | LOW | | 520 | +0/−20 KHz | |
| | HIGH | KHz | 1710 | +20/−0 KHz | |
| DISPLAY FREQUENCY ACCURACY | | KHz | +/−3 KHz | +/−5 KHz | |
| INTERMEDIATE FREQUENCY | | KHz | 450 | +/−3 KHz | |
| MAX. SENSITIVITY | 600 KHz | dB | | | |
| | 1000 KHz | | | | |
| | 1400 KHz | | | | |
| 20 dB | 600 KHz | | 90 | 92 | |
| QUIETING | 1000 KHz | dB | 88 | 92 | |
| SENSITIVITY | 1400 KHz | | 88 | 92 | |
| IMAGE | 600 KHz | | | | |
| REJECTION | 1400 KHz | dB | | | |
| IF | 600 KHz | | | | |
| REJECTION | 1400 KHz | dB | | | |
| RF OVERLOAD DIST. | 1000 KHz | % | | | |
| S/N RATIO | 1000 KHz | dB | 33 | 30 | 120 dB |
| AGC FIGURE OF MERIT | | dB | | | |
| ACA | +10 KHz | | 4 | 3 | |
| | −10 KHz | dB | 4 | 3 | |
| −6 dB | +SIDE | | | | |
| BAND WIDTH | −SIDE | KHz | | | |
| OSC DROP OUT | DC | | | | |
| 5 mV/m INPUT | AC | V | | | |
| NOISE | VOL. MIN | | | | |
| OUTPUT | VOL. MAX | mV | | | |
| MAX. POWER OUTPUT | 1000 KHz | mW | 90 | 85 | 120 dB |
| 10% THD POWER OUTPUT | 1000 KHz | mW | 80 | 75 | 120 dB |
| DIST. AT STD. OUTPUT | 1000 KHz | % | 3 | 5 | 120 dB |
| −6 dB | LOW FREQ. | | 260 | 280 | 20 dB S/N SENS. |
| AUDIO FIDELITY | HIGH FREQ. | Hz | 3000 | 2600 | 20 dB S/N SENS. |
| CURRENT DRAIN | NO SIGNAL | mA | 35 | 40 | |
| VOL. AT MAX. | MAX. | mA | 80 | 85 | 120 dB |

In one embodiment of the present invention, the FM radio of apparatus 10 has the specifications provided in Table 2.

TABLE 2

FM RADIO SPECIFICATION

| MEASUREMENT ITEM | | UNIT | NORMAL | LIMIT | TEST CONDITION |
|---|---|---|---|---|---|
| FREQUENCY | LOW | | 87.5 | +/−300 KHz | |
| RANGE | HIGH | MHz | 108.5 | +/−300 KHz | |
| DISPLAY FREQUENCY ACCURACY | | MHz | 0.1 | 0.1 | |
| INTERMEDIATE FREQUENCY | | MHz | 10.7 | +/−50 KHz | |
| MAX. SENSITIVITY | 90 MHz | dB | | | |
| | 98 MHz | | | | |
| | 106 MHz | | | | |
| 30 dB | 90 MHz | | 18 | 20 | |
| QUIETING | 98 MHz | dB | 18 | 20 | |
| SENSITIVITY | 106 MHz | | 18 | 20 | |
| IMAGE REJECTION | 106 MHz | dB | | | |
| IF REJECTION | 90 MHz | dB | | | |
| SPURIOUS | 98 MHz | dB | | | |
| SELECTIVITY | +400 KHz | | 14 | 10 | |
| | −400 KHz | dB | 14 | 10 | |
| RF OVERLOAD DIST. | 98 MHz | % | | | |
| APPARENT PEAK SEPARATION | | KHz | | | |
| S/N RATIO | 98 MHz | dB | 51 | 48 | 60 dB |
| −3 dB LIMITING SENS. | 98 MHz | dB | | | |
| AM SUPPRESSION | 98 MHz | dB | | | |
| AFC HOLD - IN | +SIDE | KHz | | | |
| RANGE WITHIN 3 dB | −SIDE | | | | |
| DSC DROP OUT | DC | | | | |
| 1 mV INPUT AT 98 MHz | AC | V | | | |
| MAX. POWER OUTPUT | 98 MHz | mW | 90 | 85 | 60 dB |
| 10% THD POWER OUTPUT | 98 MHz | mW | 80 | 75 | 60 dB |
| DIST. AT STD. OUTPUT | 98 MHz | % | 1 | 3 | |
| AUDIO FIDELITY −6 dB | LOW FREQ | Hz | 260 | 280 | 30 dB S/N SENS. |
| | HIGH FREQ | KHz | 4000 | 3500 | 30 dB S/N SENS. |
| MIN. VOLUME FEEDTHROUGH | 98 MHz | mV | | | 60 dB |
| NOISE OUTPUT | VOL. MIN | mV | | | |
| CURRENT DRAIN | NO SIGNAL | mA | 35 | 40 | |
| VOL. AT MAX. | MAX. | mA | 80 | 85 | |

All references cited herein are incorporated herein by reference in their entirety and for all purposes to the same extent as if each individual publication or patent or patent application was specifically and individually indicated to be incorporated by reference in its entirety for all purposes.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A combination light, radio and clock comprising:

a housing;

a battery source disposed and held in said housing for providing a first source of direct current;

transformer means disposed and held in said housing, said transformer means configured for receiving an alternating current from a source of alternating current and converting said alternating current to a second source of direct current;

an electric circuit disposed and held in said housing, said electric circuit connected to said battery source and said transformer means to provide said first source of direct current or said second source of direct current;

a light, a radio and a clock disposed and held in said housing, said light, said radio and said clock connected to said electric circuit for receiving the first source of direct current or the second source of direct current thereby energizing said light, said radio and said clock; wherein when said radio is set in a first mode, said radio is off regardless of whether said alternating current is available to the transformer means;

when said radio is set in a second mode, said radio is off when the alternating current is available to the transformer means and said radio is on when the alternating current is not available to the transformer means; and when said radio is set in a third mode, said radio is on regardless of whether said alternating current is available to the transformer means.

2. The combination light, radio and clock of claim 1 further comprising collapsible plug held on an exterior face of said housing, where said collapsible plug can be used to plug the device directly into an electrical outlet.

3. The combination light, radio and clock of claim 1 wherein said battery source includes a rechargeable battery and wherein said transformer means is connected to said battery source so that, when said transformer means receives alternating current from said source of alternating current and converts it to said second source of direct current, said second source of direct current recharges said rechargeable battery.

4. The combination light, radio and clock of claim 1 wherein the clock includes a display with a backlight and wherein
   (i) the backlight is not illuminated when the source of alternating current is available to the transformer means; and
   (ii) the backlight is illuminated when the source of alternating current is available to the transformer means.

5. The combination light, radio and clock of claim 1, further comprising a retractable telescopic antenna and a ferrite bar antenna disposed and held within said housing, wherein said retractable telescopic antenna and said ferrite bar antenna is in electrical communication with said radio.

6. The combination light, radio and clock of claim 5, further comprising a headphone jack disposed and held within said housing and in electrical communication with said radio, wherein, when a headphone cord is inserted in said headphone jack, said headphone cord is used by said radio as an antenna in instances where the headphone cord is inserted in the headphone jack and the retractable telescopic antenna is in a retracted position.

7. The combination light, radio and clock of claim 1, wherein
   when said light is set in a first mode, said light is off regardless of whether said alternating current is available to the transformer means;
   when said light is set in a second mode, said light is off when the alternating current is available to the transformer means and said light is on when the alternating current is not available to the transformer means.

8. The combination light, radio and clock of claim 7 further comprising a light switch provided in said electric circuit and disposed and held within said housing, wherein said light switch is in electrical communication with said light for toggling said light between said first mode and said second mode.

9. The combination light, radio and clock of claim 1, further including an alarm clock disposed and held in said housing, wherein said alarm clock is connected to said electric circuit for receiving the first source of direct current or the second source of direct current thereby energizing said alarm clock.

10. The combination light, radio and clock of claim 1 wherein said at least one battery further comprises at least one rechargeable battery.

11. The combination light, radio and clock of claim 1 wherein said battery source comprises a rechargeable battery and a non-rechargeable battery and further comprising relay means connected to said rechargeable battery and said non-rechargeable battery, whereby said non-rechargeable battery supplies direct current to said light, said radio and said clock responsive to low voltage in said rechargeable battery and operation of said relay means.

12. The combination light, radio and clock of claim 1, further comprising
   an electrical receptacle disposed and held within said housing and configured so that it can be connected to said source of alternating current.

13. The combination light, radio and clock of claim 12, wherein said electrical receptacle provides a 105–125 V, 55–65 Hz power source when connected to said source of alternating current.

14. The combination light, radio and clock of claim 1, wherein said housing includes a front face and a side face and wherein
   said light is mounted on said side face and
   said radio and said clock are each mounted on said front face.

15. The combination light, radio and clock of claim 1, wherein said housing includes a front face and a bottom face and wherein
   said light is mounted on said bottom face and
   said radio and said clock are each mounted on said front face.

16. The combination light, radio and clock of claim 1 wherein said housing is generally rectangular.

17. The combination light, radio and clock of claim 1 wherein said housing is water resistant.

18. The combination light, radio and clock of claim 1 further comprising a smoke detector disposed and held in said housing, wherein said smoke detector is connected to said electric circuit for receiving the first source of direct current or the second source of direct current thereby energizing said smoke detector.

19. A combination light, radio and clock comprising:
   a housing;
   a battery source disposed and held in said housing for providing a first source of direct current;
   a transformer disposed and held in said housing, said transformer configured for receiving an alternating current from a source of alternating current and converting said alternating current to a second source of direct current;
   a light, a radio and a clock disposed and held in said housing, said light, said radio and said clock operatively connected to said battery source and said transformer for receiving the first source of direct current and/or the second source of direct current thereby energizing said light, said radio and said clock; and
   a sensor for detecting whether said alternating current is available, the sensor in electrical communication with said radio; wherein
   when said radio is set in a first mode, said radio is off regardless of whether said sensor detects availability of said alternating current;
   when said radio is set in a second mode, said radio is off when said sensor determines that said alternating current is available and said radio is on when said sensor determines that said alternating current is not available; and
   when said radio is set in a third mode, said radio is on regardless of whether said sensor determines that said alternating current is available.

20. The combination light, radio and clock of claim 19, wherein
when said light is set in a first mode, said light is off regardless of whether said sensor determines that said alternating current is available;
when said light is set in a second mode, said light is off when said sensor determines that said alternating current is available and said light is on when said sensor determines that said alternating current is not available.

21. The combination light, radio and clock of claim 20 further comprising a light switch disposed and held within said housing, wherein said light switch is in electrical communication with said light for toggling said light between said first mode and said second mode.

22. A combination light, radio, clock and alarm comprising:
a housing;
a battery source disposed and held in said housing for providing a first source of direct current;
a transformer disposed and held in said housing, said transformer configured for receiving an alternating current from a source of alternating current and converting said alternating current to a second source of direct current;
a light, a radio, a clock and an alarm disposed and held in said housing, said light, said radio, said clock and said alarm operatively connected to said battery source and said transformer for receiving the first source of direct current and/or the second source of direct current thereby energizing said light, said radio, said clock, and said alarm; and
a sensor for detecting whether said alternating current is available, the sensor in electrical communication with said radio; wherein
when said radio is set in a first mode, said radio is off regardless of whether said sensor detects availability of said alternating current;
when said radio is set in a second mode, said radio is on when said sensor determines that said alternating current is available and said radio is off when said sensor determines that said alternating current is not available;
when said radio is set in a third mode, said radio is on regardless of whether said sensor determines that said alternating current is available;
when said light is set in a first mode, said light is off regardless of whether said sensor determines that said alternating current is available; and
when said light is set in a second mode, said light is off when said sensor determines said alternating current is available and said light is on when said sensor determines that said alternating current is not available.

23. A apparatus comprising:
a housing;
a battery source disposed and held in said housing for providing a first source of direct current;
a transformer disposed and held in said housing, said transformer configured for receiving an alternating current from a source of alternating current and converting said alternating current to a second source of direct current;
a radio held in said housing, said radio operatively connected to said battery source and said transformer for receiving the first source of direct current and/or the second source of direct current thereby energizing said radio; and
a sensor for detecting whether said alternating current is available, the sensor in electrical communication with said radio; wherein
when said radio is set in a first mode, said radio is off regardless of whether said sensor detects availability of said alternating current;
when said radio is set in a second mode, said radio is on when said sensor determines that said alternating current is available and said radio is off when said sensor determines that said alternating current is not available; and
when said radio is set in a third mode, said radio is on regardless of whether said sensor determines that said alternating current is available.

* * * * *